(12) United States Patent
Ryser (10) Patent No.: US 7,313,730 B1
(45) Date of Patent: Dec. 25, 2007

(54) CONFIGURATION LOGIC FOR EMBEDDED SOFTWARE

(75) Inventor: Peter Ryser, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 620 days.

(21) Appl. No.: 10/850,123

(22) Filed: May 20, 2004

(51) Int. Cl.
  *G06F 11/00* (2006.01)
(52) U.S. Cl. .................. 714/30; 714/25; 714/27; 714/28; 714/31; 714/45; 716/16; 716/17
(58) Field of Classification Search .......... 714/28, 714/30, 25, 27, 31, 45, 51; 716/16, 17
  See application file for complete search history.

(56) References Cited

U.S. PATENT DOCUMENTS

| | | | |
|---|---|---|---|
| 5,869,979 A * | 2/1999 | Bocchino ............ | 326/38 |
| 6,134,707 A * | 10/2000 | Herrmann et al. ........ | 717/139 |
| 6,429,682 B1 * | 8/2002 | Schultz et al. ............ | 326/41 |
| 6,751,723 B1 * | 6/2004 | Kundu et al. ............ | 712/36 |
| 6,918,057 B1 * | 7/2005 | Brophy et al. ............ | 714/30 |
| 6,954,879 B1 * | 10/2005 | Tobias et al. ............ | 714/30 |
| 6,983,441 B2 * | 1/2006 | Wescott .............. | 716/17 |
| 7,089,140 B1 * | 8/2006 | McKenzie et al. ........ | 702/122 |
| 7,109,750 B2 * | 9/2006 | Vadi et al. ............ | 326/40 |
| 7,111,217 B1 * | 9/2006 | Schultz ............ | 714/727 |
| 7,149,926 B2 * | 12/2006 | Ahmad et al. ............ | 714/30 |
| 7,149,927 B2 * | 12/2006 | Stancil ............ | 714/31 |

OTHER PUBLICATIONS

Xilinx, Inc.; "Virtex-II Pro Platform FPGA Handbook"; Oct. 14, 2002; pp. 27-69, available from Xilinx, Inc., 2100 Logic Drive, San Jose, California 95124.
Xilinx, Inc.; "System ACE CompactFlash Solution," Advance Product Specification, Apr. 5, 2002, pp. 1-69, DS080 V1.5, available from Xilinx, Inc., 2100 Logic Drive, San Jose, CA 95124.

* cited by examiner

*Primary Examiner*—Robert Beausoliel
*Assistant Examiner*—Joseph D Manoskey
(74) *Attorney, Agent, or Firm*—William L. Paradice, III (57) ABSTRACT

An integrated circuit such as an FPGA containing an embedded processor having test circuitry capable of controlling the processor's resources using JTAG commands includes a formatting circuit that formats soft data received from an external storage device into a JTAG-compatible bitstream that can be used by the processor's test circuitry to access and/or control the processor's resources at any time, thereby allowing the embedded processor's resources to be accessed and controlled during FPGA configuration operations before the processor has been initialized to an operational state without using an external configuration tool. For some embodiments, the formatting circuit is a state machine that formats soft data such as firmware code, software programs, processor commands, and the like received from the external storage device into a JTAG-compatible bitstream that can be loaded into and/or used to access the resources of the embedded processor via the processors' test circuitry.

46 Claims, 10 Drawing Sheets

CONFIGURATION LOGIC FOR EMBEDDED SOFTWARE

FIELD OF INVENTION

The present invention relates generally to integrated circuits, and more specifically to the configuration of embedded processors.

DESCRIPTION OF RELATED ART

A programmable logic device (PLD) is a well-known general purpose device that can be programmed by a user to implement a variety of selected functions. PLDs are becoming increasingly popular with circuit designers because they are less expensive, more flexible, and require less time to implement than custom-designed integrated circuits such as Application Specific Integrated Circuits (ASICs).

There are many types of PLDs such as Field Programmable Gate Arrays (FPGAs) and complex PLDs (CPLDs). For example, an FPGA typically includes an array of configurable logic blocks (CLBs) and block RAM surrounded by a plurality of input/output blocks (IOBs). The CLBs are individually programmable and can be configured to perform a variety of logic functions. The IOBs are selectively connected to various I/O pins of the FPGA, and can be configured as either input buffers or output buffers. The block RAM can store data during operation of the FPGA and/or can be configured to implement various functions such as FIFO memories and state machines. The CLBs, IOBs, and block RAM are selectively connected to each other to implement more complex logic functions by a programmable interconnect structure.

The CLBs, IOBs, and the programmable interconnect structure are typically programmed by loading configuration data into configuration memory cells which control the states of various configurable elements (e.g., switches, multiplexers, and the like) that configure the CLBs, IOBs, and the interconnect structure to implement a desired function. The configuration data, which is usually stored in an external non-volatile memory such as a Programmable Read Only Memory (PROM), an Electrically Erasable PROM (EEPROM), or a Flash memory, is provided via one or more configuration input pins to a well-known configuration circuit within the FPGA. The configuration circuit routes the configuration data to corresponding configuration memory cells to configure the FPGA to implement the circuit design embodied by the configuration data.

More recent FPGAs such as the Virtex-II Pro™ FPGAs from Xilinx, Inc. include an embedded microprocessor to provide additional functionality. The embedded processor typically includes well-known components such as CPU execution units, fetch and decode units, instruction units, cache memory, architectural registers, bus systems, test circuitry, and the like. The processor's firmware code is typically stored with the configuration data in the external storage device and loaded into a selected portion of block RAM during configuration of the FPGA. After the FPGA is configured, the processor can retrieve the firmware code from the selected portion of block RAM to initialize itself to an operational state.

Unfortunately, conventional FPGA configuration circuits cannot access the embedded processor's cache memory, internal registers, bus system, or other CPU resources during configuration of the FPGA because the processor is not yet operational. The inability to access and/or control the processor's internal resources during configuration of the FPGA can be disadvantageous. For example, if the embedded processor's firmware code is sufficiently small to be stored in cache memory, then loading the firmware code into the processor's cache memory during configuration of the FPGA would allow the processor to initialize itself using firmware code retrieved from cache memory rather than from block RAM, thereby improving performance by reducing memory latencies during initialization of the embedded processor.

One solution is to use well-known JTAG test circuitry included on the FPGA to access the processor's internal resources during configuration of the FPGA. The JTAG test circuitry, which was developed by the Joint Test Action Group and is commonly referred to as the IEEE standard 1149.1, includes a boundary scan architecture, a test access port (TAP) controller, and four dedicated JTAG I/O pins. The boundary scan architecture, which includes a chain of registers placed around the periphery of the FPGA, is connected to the dedicated JTAG I/O pins via the TAP controller, which in turn controls operation of the boundary scan architecture using well-known JTAG signals provided on the dedicated JTAG I/O pins. As known in the art, the JTAG test circuitry can be used to configure the FPGA and to access and/or control the internal resources of the FPGA's embedded processor during configuration of the FPGA. For example, an external configuration tool can be connected to the FPGA's dedicated JTAG pins and used to load soft data such as firmware code into the embedded processor's cache memory during configuration of the FPGA by controlling the processor's JTAG test circuitry.

However, using an external configuration tool to configure an FPGA and/or its embedded processor via its JTAG test circuitry may be disadvantageous. For example, the JTAG test circuitry and its governing standards were developed for testing purposes, and thus are not optimized for configuring FPGA components. Further, many customers prefer to configure the FPGA and its embedded processor using the FPGA's serial or parallel configuration port, which does not require an external configuration tool. For example, because an FPGA's parallel configuration port allows for higher data bandwidth than does the JTAG test circuitry's serial input pin, the FPGA can typically be configured much faster by using its parallel configuration port rather than using an external configuration tool connected to the FPGA's JTAG test circuitry.

Thus, it would be desirable to access and/or control the internal resources of an FPGA's, or other integrated circuit, embedded processor during configuration of the FPGA without using an external configuration tool.

SUMMARY

An integrated circuit (IC), such as an FPGA, is disclosed that allows access to an embedded processor's internal resources using data provided to the IC from an external storage device via the IC's configuration port. In accordance with the present invention, an IC containing an embedded processor having test circuitry capable of controlling the processor's internal resources using JTAG commands includes a formatting circuit that formats soft data received from an external storage device into a JTAG-compatible bitstream that can be used by the processor's test circuitry to access and/or control the processor's internal resources at any time. In this manner, embodiments of the present invention allow the embedded processor's internal resources to be accessed and controlled during IC configuration operations before the processor has been initialized to an operational state without using an external configuration tool connected to the IC's own test circuitry. For one embodiment, firmware code stored in an external storage device that also stores configuration data for the IC's configurable elements may be received into the IC via its configuration port and then loaded into the embedded processor's cache memory during IC configuration using the formatting circuit. The ability to access the embedded processor's internal resources during IC configuration without using an external configuration tool may result in cost savings, reductions in configuration time, increased durability, and less burden on customers.

The formatting circuit includes an input to receive data from the external memory via the IC configuration port, and includes outputs connected to corresponding inputs of the embedded processor's test circuitry. For some embodiments, the formatting circuit is a state machine that formats soft data such as firmware code, software programs, processor commands, and the like received from the external storage device into a JTAG-compatible bitstream that can be used to access, control, and/or load data into the embedded processor's internal resources using the processors' test circuitry. In this manner, the formatting circuit emulates the operation of an IC's JTAG test circuitry in providing data from an external configuration tool to the processor. For some embodiments, the soft data is stored in the external storage device as a plurality of JTAG data and mode select bit pairs. Configuration data for the configurable elements may also be stored in the external storage device as a plurality of JTAG test and mode select bit pairs. For some embodiments, the configuration data is stored in a first partition of the external storage device, and the soft data is stored in a second partition of the external storage device. For one embodiment, the soft data includes a start code that may be used to transition the formatting circuit state machine into an operational state.

Embodiments of the present invention support various serial and parallel configuration modes. For some embodiments, the IC includes a plurality of formatting circuits, each configured to receive data from the external storage device using a different configuration mode. For other embodiments, the formatting circuit is programmable to operate using one of a plurality of different configuration modes in response to a mode select signal. Present embodiments may also be used in an FPGA having multiple processors.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

Embodiments of the present invention are described below with respect to an exemplary FPGA architecture that is generally representative of the Virtex-II Pro™ FPGAs from Xilinx, Inc. for simplicity only. It is to be understood that embodiments of the present invention are equally applicable other FPGA architectures and to other integrated circuits (ICs), including programmable logic devices such as complex PLDS, that include a processor having JTAG test circuitry. In the following description, for purposes of explanation, specific nomenclature is set forth to provide a thorough understanding of the present invention. For example, as used herein, configuration data generally refers to data that controls the configuration state of various configurable elements such as CLBs, IOBs, and programmable routing structures, and soft data generally refers to data such as software and firmware code that can be used to loaded into the IC processor's internal resources and to instructions that can be used to access and/or control processor's internal resources. In other instances, well-known circuits and devices are shown in block diagram form to avoid obscuring the present invention. Further, the logic levels assigned to various signals in the description below are arbitrary and, thus, can be modified (e.g., reversed polarity) as desired. Accordingly, the present invention is not to be construed as limited to specific examples described herein but rather includes within its scope all embodiments defined by the appended claims.

Figure 1:
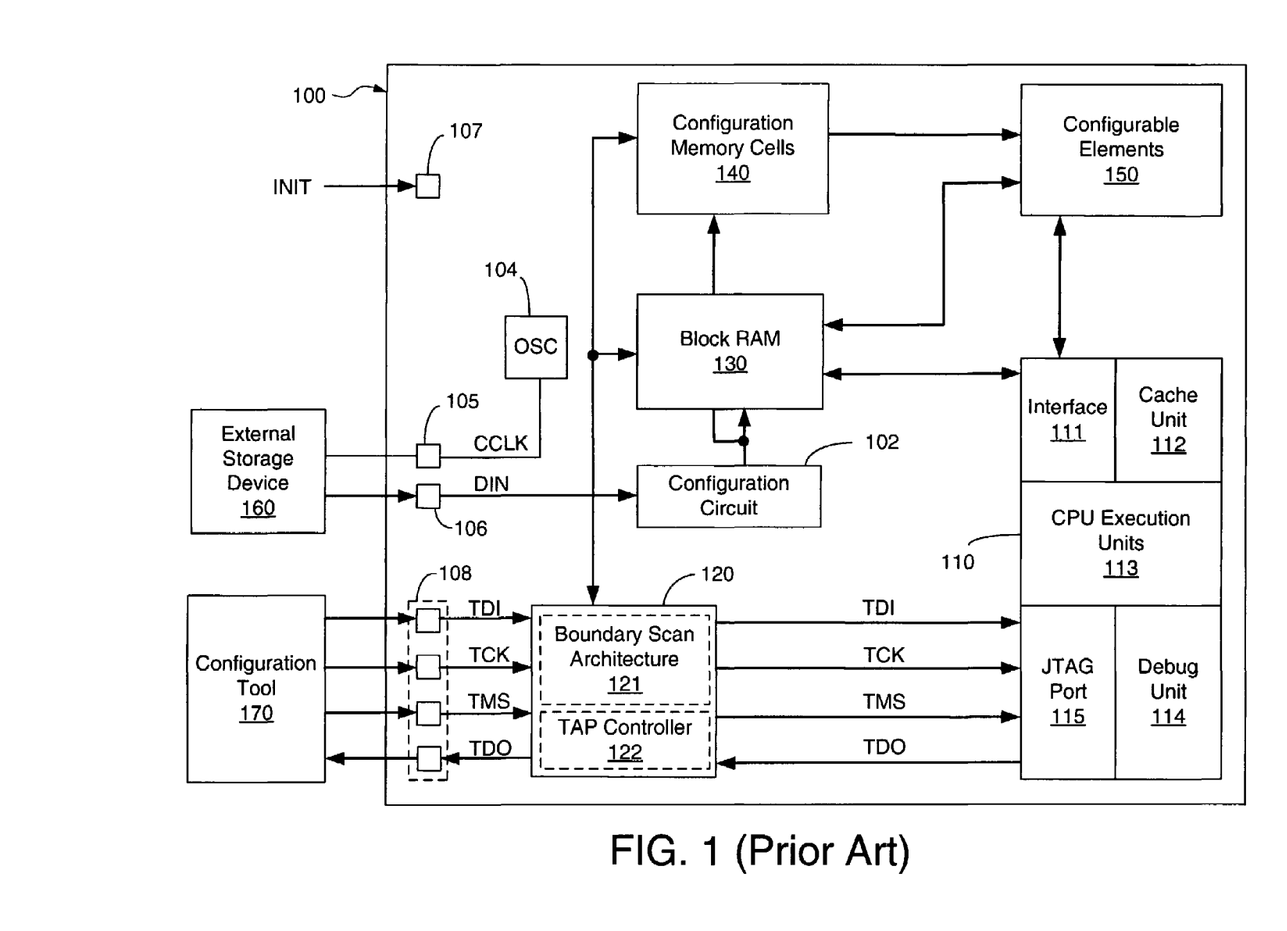
FIG. 1 is a functional block diagram illustrating a prior configuration architecture of an FPGA.

FIG. 1 is a functional block diagram of a prior FPGA architecture 100 which is generally representative of the Virtex-II Pro™ family of FPGA products that are commercially available from Xilinx, Inc. As known in the art, FPGA 100 can be configured using data supplied to the FPGA from an external storage device 160 or using data supplied by an external configuration tool 170. External storage device 160 can be any suitable storage element such as a non-volatile memory (e.g., a PROM, EEPROM or flash memory device), an external processor, or another FPGA. Configuration tool 170 is a well-known external tool that configures FPGA 100 using the FPGA's internal test circuitry (e.g., the JTAG test circuitry). FPGA 100 is shown to include a configuration circuit 102, an oscillator 104, a configuration clock pin 105, one or more data configuration pins 106 (only one data pin 106 is shown in FIG. 1 for simplicity), an initialization pin 107, dedicated JTAG pins 108, an embedded processor 110, a JTAG-compliant test circuit 120, block RAM 130, configuration memory cells 140, and configurable elements 150. Other well-known components of FPGA 100 are not shown in FIG. 1 for simplicity. Further information regarding the general layout and operation of FPGA 100 can be found in the "Platform FPGA Handbook 2002," pages 27-68, which is available from Xilinx, Inc. and incorporated herein by reference.

Configuration circuit 102 includes a data input to receive input data DIN from external storage device 160 via pin 106, and includes a data output connected to block RAM 130 and to configuration memory cells 140. Configuration circuit 102, whose architecture is well-known, may be used to load configuration data received from external storage device 160 into configuration memory cells 140 and into block RAM 130. Configuration circuit 102 may also be used to load soft data received from external storage device 160 into block RAM 130. Block RAM 130, which is well-known, typically stores data that can be accessed by configurable elements 150 and by processor 110. Configuration memory cells 140, which are well-known, typically store configuration data that controls the configuration states of configurable elements 150. Configurable elements 150 represent various well-known FPGA programmable components such as CLBs, IOBs, general interconnect and routing structures, and the like.

Processor 110 can be any well-known microprocessor that includes JTAG-compliant test and/or debug circuitry. For the Virtex-II Pro™ FPGAs, processor 110 is a well-known PowerPC processor core available from IBM Corporation. Processor 110 is shown in FIG. 1 as including an FPGA interface unit 111, a cache unit 112, CPU execution units 113, a debug unit 114, and a JTAG port 115. Interface unit 111 is well-known, and facilitates communication between processor 110 and FPGA components such as block RAM 130 and configurable elements 150. Cache unit 112 is well-known, and includes a cache memory that can store data and instructions frequently requested by execution units 113. For some embodiments, cache unit 112 includes an instruction cache and a data cache. CPU execution units 113 are well-known, and typically include a plurality of general purpose registers, an architectural register, an arithmetic logic unit (ALU), a media access controller (MAC), fetch and decode logic, and other well-known components. Debug unit 114 is well-known, and provides external access to CPU resources such as the general purpose and architectural registers, cache memory, and the CPU bus system. The debug unit 114 has read-write access to all registers, can set hardware or software breakpoints, and can start the CPU core, step an instruction, freeze the timers, and set hardware or software breakpoints. JTAG port 115, which is well-known and complies with the IEEE 1149.1 standard, provides basic JTAG chip testing functionality and allows external configuration tool 170 to gain control of processor 110 and its internal resources using well-known JTAG commands. Other well-known components of processor 110 such as the processor's switch fabric, clock signals, memory controllers, bus systems, and the like are not shown in FIG. 1 for simplicity.

Test circuit 120 is a well-known test circuit that complies with IEEE standard 1149.1, and is shown to include a boundary scan architecture 121 and a TAP controller 122. Boundary scan architecture 121 and TAP controller 122 are conventional and operate according to well-known JTAG protocols. TAP controller 122 includes three input connections for receiving the test clock input (TCK) signal, the test mode select (TMS) signal, and the test data input (TDI) signal from corresponding dedicated JTAG I/O pins 108. The TMS signal is used to control the state of TAP controller 122, as discussed below. The TDI signal is used for serial transmission of data or instruction bits, depending upon the state of TAP controller 122. TAP controller 122 also includes an output connected to a corresponding JTAG pin 108 through which the test data out (TDO) signals are transmitted. Depending upon the state of TAP controller 122, the TDO signal is used to serially shift data out of JTAG test circuit 120. TAP controller 122 also includes three outputs to provide TDI, TCK, and TMS to corresponding inputs of processor 110's JTAG port 115, and includes an input to receive TDO from a corresponding output of the processor's JTAG port 115.

Figure 2:
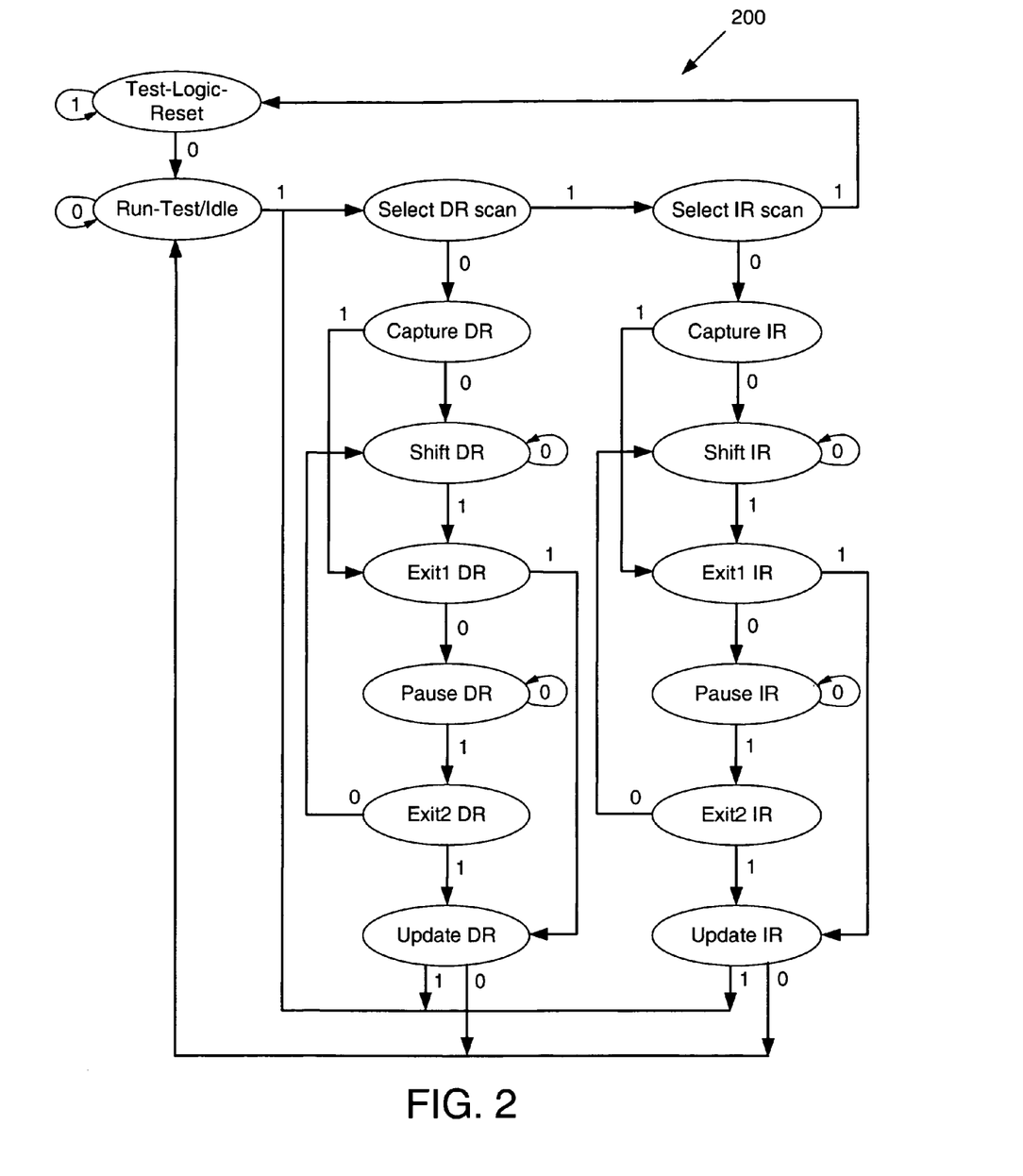
FIG. 2 is a state diagram of the TAP controller of the FPGA of FIG. 1.

FIG. 2 is a state diagram for explaining the operation of TAP controller 122. The basic function of TAP controller 122 is to generate clock and control signals required for the correct sequence of operations of boundary scan architecture 121 and processor 110's debug unit 114. Specifically, TAP controller 122 generates control signals that facilitate loading of instructions and data into boundary scan architecture 121 and processor debug unit 114, and performing test actions such as capture, shift and update test data. As known in the art, TAP controller 122 can be used to configure configurable elements 150 via boundary scan architecture 121 and can be used to access and/or control the internal resources of processor 110 via the processor's JTAG port 115 and debug unit 114.

In operation, TAP controller 122 is initialized to the Test-Logic Reset state. From the Test-Logic Reset state, TAP controller 122 enters a Run-Test/Idle state when TMS is held low (e.g., TMS=0) for at least one TCK pulse. TAP controller 122 is placed in this state, for example, while program, erase, blank and verify operations are performed on block RAM 130, configuration memory cells 140, and/or configurable elements 150 via boundary scan architecture 121 and while such operation are performed within processor 110 via debug unit 114. During test procedures, TAP controller 122 either enters a data register (DR) branch of the state machine or an instruction register (IR) branch of the state machine.

When TAP controller 122 enters the DR branch of the state diagram, either a selected data register(s) in boundary scan architecture 121 or in processor 110 is connected between TDI and TDO to load data therein. Specifically, the Capture-DR state is used to load data into the data register (s). The Shift-DR state is used to shift previously captured data toward the TDO connector in response to TCK pulses. The Exit1-DR state, Pause-DR state, and Exit2-DR state are used to switch between selected states and to temporarily halt a shifting process. TAP controller 122 remains in the Pause-DR state until TMS is held high (e.g., TMS=1), at which time it enters the Exit2-DR state. From the Exit2-DR state, TAP controller 122 either returns to the Shift-DR state or enters the Update-DR state. Once TAP controller 122 is in the Update-DR state, data shifting to/between the selected register(s) is completed, and the data stored in the selected register(s) can be passed to the JTAG outputs. From the Update-DR state, TAP controller 122 either returns to the Run-Test/Idle state or to the Select-DR state.

The IR branch of the state machine is used to load instructions into boundary scan architecture 121 and/or processor 110 for subsequent test data operations. The states of the IR branch are similar to the states of the DR branch, and are therefore not discussed in further detail.

Referring again to FIG. 1, external storage device 160 can store configuration data for configurable elements 150 and soft data for processor 110. External storage device 160 has an output connected to configuration data pin(s) 106, and has a clock input that can receive a configuration clock signal CCLK from oscillator 104 via FPGA clock pin 105. External storage device 160 can support both serial and parallel data transfers to configuration circuit 102 via FPGA data pin(s) 106. As known in the art, Virtex-II Pro™ FPGAs support multiple configuration modes that can be selected, for example, by a user. For example, in a first configuration mode commonly known as the master-serial mode, CCLK is generated internally by oscillator 104 and is provided to external storage device 160 via pin 105 to clock a serial configuration bitstream from external storage device 160 to configuration circuit 102 via data pin 106. In a second configuration mode commonly known as the slave-serial mode, external storage device 160 provides a serial bitstream to FPGA 100 via pin 106 in response to an externally generated CCLK signal. In a third configuration mode commonly known as the master SelectMap mode, external storage device 160 provides data in parallel (e.g., in a byte-wide format) via multiple data pins 106 in response to an internally generated CCLK signal. In a fourth configuration mode commonly known as the slave SelectMap mode, external storage device 160 provides parallel data to FPGA 100 in response to an externally generated CCLK signal. The selection of configuration modes for FPGA 100 is well-known, and is thus not described herein. For more information regarding the various configuration modes of FPGA 100, refer to the "Platform FPGA Handbook 2002" pages 68-69, which is incorporated herein by reference.

Configuration tool 170 includes I/O terminals connected to FPGA 100's dedicated JTAG pins 108. Configuration tool 170 may be used to load configuration data into block RAM 130 and/or configuration memory cells 140 using JTAG commands via TAP controller 122 and boundary scan architecture 121 in a well-known manner. Further, configuration tool 170 may be used to access and/or control the internal resources of processor 110 by using TAP controller 122 as a conduit to transmit JTAG-compliant commands from configuration tool 170 to processor 110's debug unit 114 via JTAG port 115 in a well-known manner. For example, configuration tool 170 can be used to load soft data such as firmware code into the processor 110's cache memory after configuration of the FPGA.

As discussed above, FPGA 100 can be configured using data received from either external storage device 160 or from configuration tool 170 in a well-known manner. For example, to configure FPGA 100 and processor 110 from external storage device 160, the configuration data and the processor's firmware code are first stored in external storage device 160. An initialization signal INIT provided to FPGA pin 107 is asserted to indicate the start of the configuration operation and to commence the retrieval of data from external storage device 160 to configuration circuit 102. For example, in the master serial mode, oscillator 104 outputs CCLK to external storage device 160 via FPGA pin 105 in response to the asserted state of INIT, and external storage device 160 uses CCLK to clock the configuration data and the soft data into FPGA 100 via FPGA pin(s) 106. Configuration circuit 102 first loads the configuration data into configuration memory cells 140, and then loads the firmware code into a selected portion of block RAM 130. The configuration data configures the configurable elements 150 to implement a desired circuit design, and also maps the selected portion of block RAM 130 to processor 110. INIT is then de-asserted, and oscillator 104 drives the CCLK pin 105 to a high impedance state, which prevents external storage device 160 from outputting additional data to FPGA 100. Thereafter, configurable elements 150 can be configured using the configuration data stored in configuration memory cells 140 in a well-known manner. After FPGA 100 is configured, processor 110 can retrieve the firmware code from the selected portion of block RAM 130 and thereafter initialize itself in a well-known manner.

To configure FPGA 100 and processor 110 using configuration tool 170, the configuration data and the firmware code may be stored in a JTAG format in an external device such as a memory card (not shown for simplicity) within or associated with configuration tool 170. When INIT is asserted, configuration tool generates TCK and TMS to clock the configuration data and the firmware code as a serial bitstream TDI into TAP controller 122. TAP controller 122 uses boundary scan architecture 121 to load the configuration data into configuration memory cells 140, and uses processor 110's debug unit 114 to load the firmware code into processor 110. Then, INIT is de-asserted, and processor 110 can initialize itself by retrieving the firmware code from cache memory rather than from block RAM 130. In addition, configuration tool 170 can use JTAG circuitry 120 to load new data (e.g., new firmware code) into the embedded processor's cache memory without having to re-configure other portions (e.g., configurable elements 150) of FPGA 100. The operation of configuration tool 170 to configure FPGA 100's configurable elements 150 and to access, control, and load data into the internal resources of processor 110 during configuration of FPGA 100 is well-known, and is therefore not described in further detail herein. For some embodiments, the well-known System ACE tool available from Xilinx, Inc. may be used as configuration tool 170. Information detailing operation of the System ACE tool can be found in the Advanced Product Specification for the System ACE CompactFlash Solution dated Apr. 5, 2002 (DS080 v1.5), which is available at www.xilinx.com and is incorporated by reference herein.

As described above, configuration circuit 102 is not normally used to access, control, or load data into processor 110's internal resources during configuration of FPGA 100 because processor 110 is typically not operational until after FPGA 100 has been configured. Further, although configuration tool 170 can be used to access, control, and load data into processor 110 during configuration of FPGA 100, using configuration tool 170 to configure FPGA 100 may be disadvantageous, as discussed above. Further, because configuration tool 170 typically includes a removable device such as a compact flash memory card to store the data file that configures FPGA 100, configuration tool 170 may not be desirable for applications that are exposed to physically stressful environments (e.g., for military and space applications).

Figure 3:
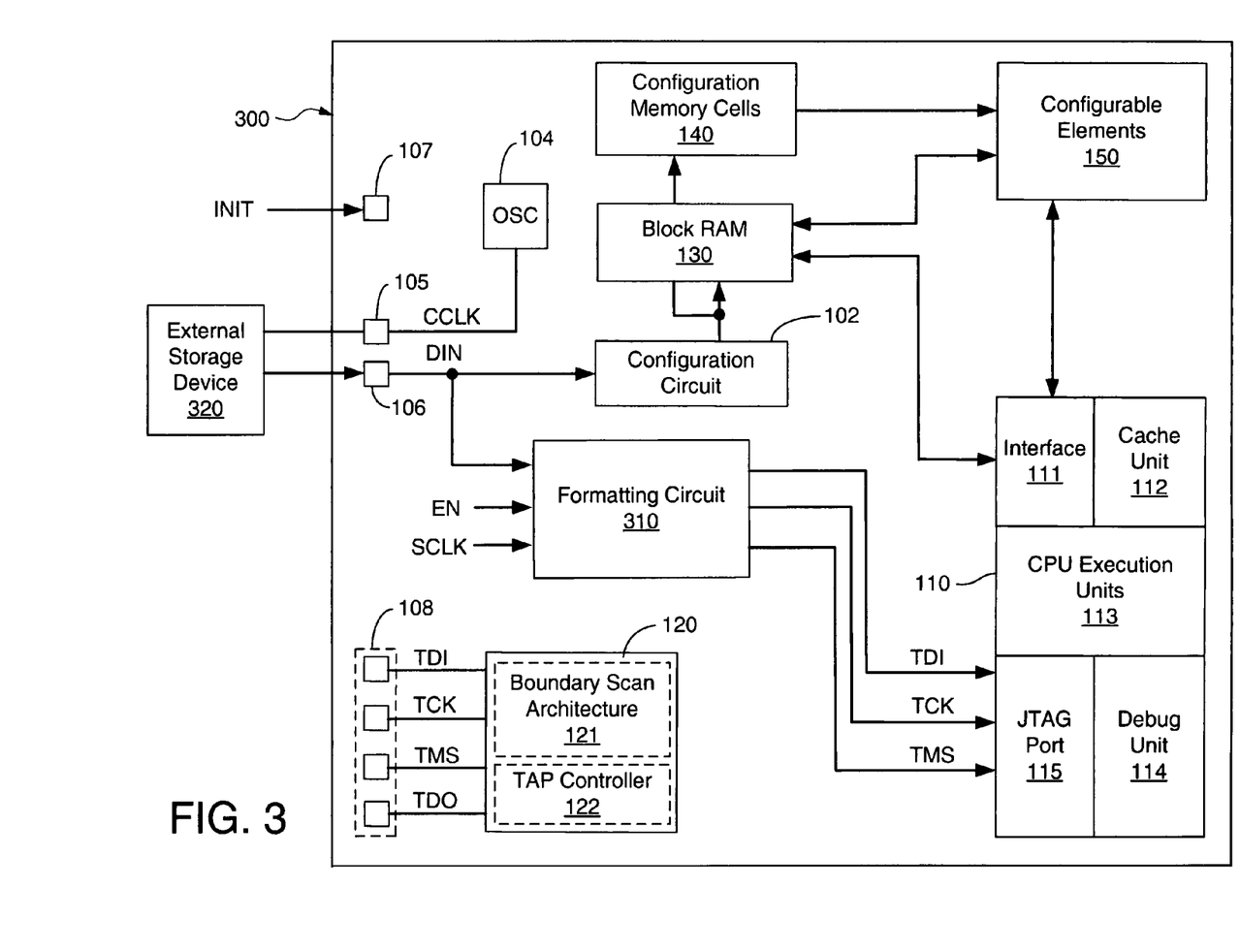
FIG. 3 is a functional block diagram of an FPGA generally representative of embodiments of the present invention.

FIG. 3 is a functional block diagram of an FPGA architecture 300 in accordance with the present invention that allows soft data stored in external storage device 160 to be loaded into and/or used to control various internal resources of the embedded processor 110 during configuration of FPGA 300 without using an external configuration tool. The architecture of FPGA 300, which is consistent with the Virtex-II Pro™ FPGA devices from Xilinx, Inc., is similar to and may include all the components of the FPGA architecture of FIG. 1. Thus, because the architecture and operation of configuration circuit 102, processor 110, test circuit 120, block RAM 130, configuration memory cells 140, and configurable elements 150 of FPGA 300 are well-known, a detailed description is not repeated here. Further, although for some embodiments processor 110 is PowerPC processor core from IBM Corporation, other embodiments of FPGA 300 may use other processor cores that include JTAG-compliant test and debug circuitry. In addition, although FPGA 300 is shown to include one processor core 110, for other embodiments, FPGA 300 may include multiple processor cores 110. For simplicity, connections between test circuit 120 and other components of FPGA 300 are not shown in FIG. 3. For other embodiments, test circuitry 120 can be eliminated, and JTAG pins 108 can be used for other (e.g., non-JTAG) purposes.

FPGA 300 is shown connected to an external storage device 320 via its configuration port 106 and a configuration clock pin 105. External storage device 320 can be any well-known device (e.g., a PROM, EEPROM, flash memory, processor, FPGA) that can be used to load data into FPGA 300 via its configuration port 106. For some embodiments, external storage device 320 is divided into first and second partitions, where the first partition stores configuration data that is to be used to configure configurable elements 150 and the second partition stores soft data that is to be loaded into and/or used to control the resources available to embedded processor 110. For other embodiments, external storage device 320 may not be partitioned. For still other embodiments, storage device 320 may be included within FPGA 300.

In accordance with the present invention, FPGA 300 includes a formatting circuit 310 that can be used to access the internal resources of processor 110 via the processor's JTAG port 115 and debug unit 114 during configuration operations of FPGA 300. Formatting circuit 310 is a state machine that includes a data input port to receive input data DIN from external storage device 320 via configuration data port 106, a clock input to receive a clock signal SCLK, a control input to receive an enable signal EN, and an output port having three outputs connected to corresponding TDI, TCK, and TMS inputs of the processor's JTAG port 115. The clock signal SCLK can be any suitable clock signal that can control operation of formatting circuit 310. For some embodiments, SCLK is the FPGA system clock, although other clock signals can be used. The enable signal EN can be any suitable signal that enables formatting circuit 310 to receive and process soft data received from external storage device 320 via DIN. For some embodiments, EN is asserted when the FPGA's configurable elements 150 are initialized (e.g., configured) to their desired states. For other embodiments, EN can be generated when all the configuration data stored in external storage device 320 has been loaded into FPGA 300. When enabled, formatting circuit 310 formats the soft data from DIN into a JTAG-compatible TDI bitstream that can be loaded into processor 110 via its JTAG port 115 using the well-known TMS and TCK signals. Once provided to processor 110, the bitstream may be used by debug unit 114 to access, control, and/or load data into the processor's internal resources in a well-known manner.

For some embodiments, formatting circuit 310 generates the TDI, TCK, and TMS signals in response to input data in the same manner as TAP controller 122 of FPGA 100. Thus, for such embodiments, formatting circuit 310 emulates the operation of TAP controller 122 and configuration tool 170 to access and control the internal resources of processor 110 during configuration of FPGA 300. Further, formatting circuit 310 may generate TCK in any suitable manner. For some embodiments, formatting circuit 310 uses SCLK to generate TCK. For other embodiments, other clock signals may be used to generate TCK.

Figure 4:
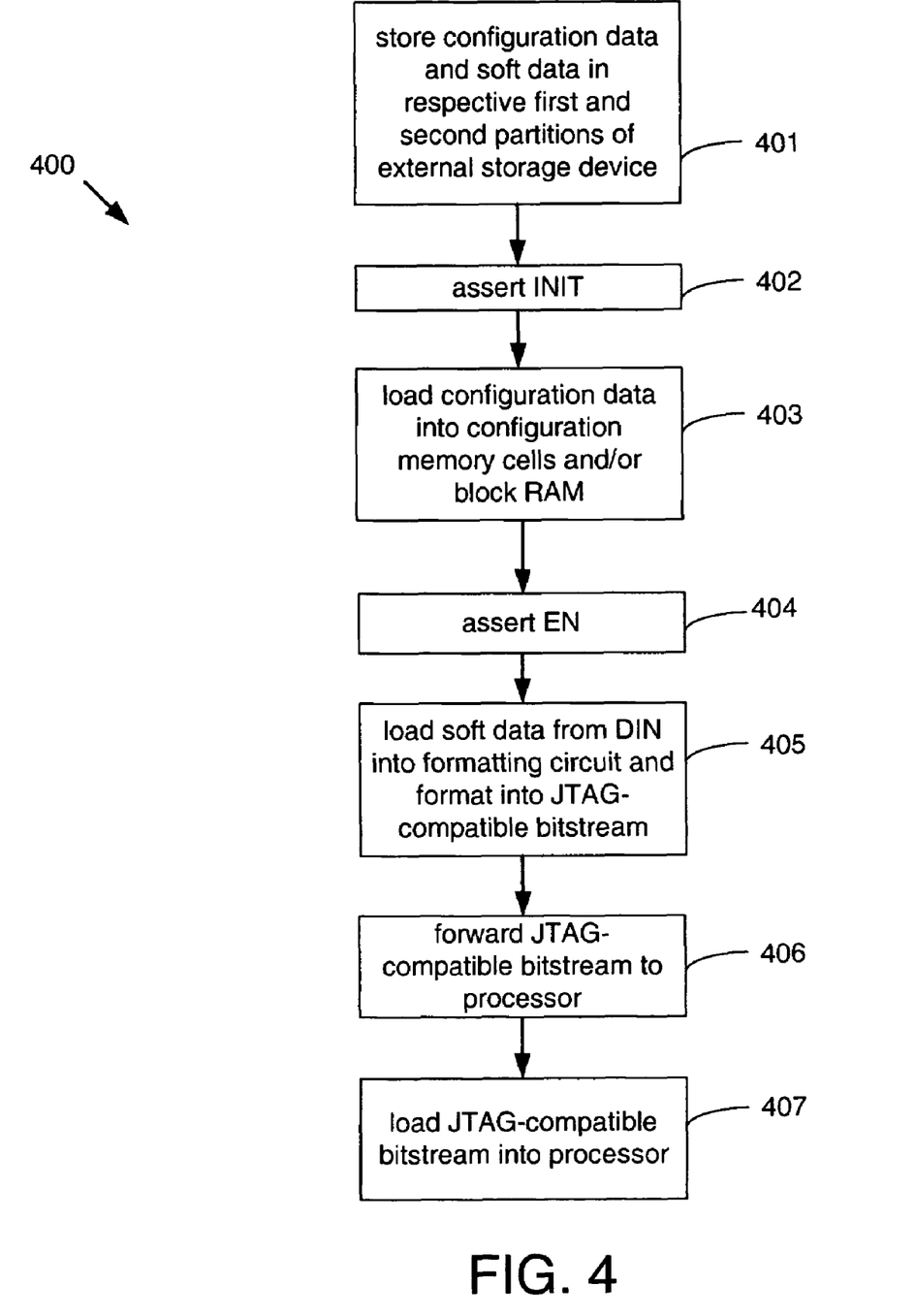
FIG. 4 is a flow chart illustrating an exemplary configuration operation of the FPGA of FIG. 3.

An exemplary, simplified configuration operation for one embodiment of FPGA 300 in which external storage device 320 is partitioned is described below with respect to the flow chart of FIG. 4. However, it is to be understood that for other embodiments, external storage device 320 may not be partitioned. First, the configuration data for configurable elements 150 is stored in the first partition of external storage device 320, and the soft data for processor 110 is stored in the second partition of external storage device 320 (401). Then, the initialization signal INIT is asserted to commence configuration of FPGA 300 (402). In response to the asserted state of INIT, the configuration data stored in the first partition of external storage device 320 is clocked into configuration circuit 102 via configuration port 106, and configuration circuit 102 loads the configuration data into configuration memory cells 140 and/or block RAM 130 to configure the configurable elements 150 to desired states in a well-known manner (403).

After the configuration data from the first partition of external storage device 160 is loaded into FPGA 300, EN is asserted to enable formatting circuit 310 to receive soft data from the second partition of external storage device 320 (404). For some embodiments, EN may be asserted by configuration circuit 102 in response to receiving all the configuration data from the first partition of the external storage device. For other embodiments, EN may be asserted in response to the configuration of configurable elements 150, or by another suitable circuit. In response to the asserted state of EN, formatting circuit 310 receives the soft data contained in DIN and formats the soft data into a JTAG-compatible bitstream (405). The JTAG-compatible bitstream is provided to debug unit 114 of processor 110 via its JTAG port 115 (406), and thereafter may be used to access, control, and/or load data into the internal resources of processor 110 in a well-known manner (407). Steps 402-408 may be subsequently repeated, for example, to re-configure FPGA 300 and/or to update firmware code or other software stored within embedded processor 110.

The soft data embodied within the JTAG-compatible bitstream provided to processor 110 by formatting circuit 310 can include data and/or instructions to access, write, and/or control various internal resources of processor 110 as well as any external resources available to processor 110 (for simplicity, specific external resources available to processor 110 are not shown in FIG. 3). For some embodiments, the soft data is firmware code for processor 110. For example, firmware code stored in external storage device 320 can be formatted into a JTAG-compatible bitstream by formatting circuit 110 and loaded into the processor's cache memory 112 via its JTAG port 115 and debug unit 114 during initial configuration of the FPGA. For another embodiment, the soft data is a well-known bus command for the embedded processor's bus system. For yet another embodiment, the soft data is data that may be loaded into the embedded processor's architectural register and/or general purpose registers.

The ability to load firmware code into the processor's cache memory during configuration of FPGA 300 allows processor 110 to initialize itself using data retrieved from cache memory, thereby eliminating latencies associated with retrieving data from block RAM 130. In addition, present embodiments allow firmware code and other software stored in the processor's cache memory, internal registers, or other memory resources to be updated without having to re-configure the FPGA configurable elements 150 of FPGA 300, thereby allowing data stored in the embedded processor's internal resources to be easily modified, for example, to fix a software glitch.

Because embodiments of the present invention allow the internal resources of an embedded processor 110 in an FPGA to be accessed, controlled, and/or configured via the FPGA's configuration port 106 at any time, prior external configuration tools which access the embedded processor via the FPGA's JTAG test circuitry 120 are not required, for example, to gain access to the internal resources of the processor prior to initialization of the processor (e.g., during configuration of the FPGA). The ability to access the internal resources of the processor using the FPGA configuration port is advantageous because it allows customers to easily pre-load or modify data within the embedded processor using data stored in the external storage device, which as discussed above may result in cost savings, faster configuration operations, and increased durability. In addition, because formatting circuit 310 formats soft data received from external storage device 320 into a JTAG-compatible bitstream, any embedded processor having JTAG test circuitry may used with present embodiments without modification.

As mentioned above, formatting circuit 310 converts soft data contained in DIN from external storage device 320 into a JTAG-compatible format (e.g., a TDI bitstream) that can be loaded into processor 110 using well-known TMS and TCK signals. For many embodiments, the configuration data and the soft data are stored in corresponding partitions of external storage device 320 as a plurality of TMS/TDI bit pairs. For some embodiments, a start code is inserted at the beginning of the soft data. The start code may be any predetermined sequence of bit pairs that can be used by formatting circuit 310 to detect the beginning of the soft data. For one embodiment, the start code is a predetermined number of [1,1] bit pairs followed by a [1,0] bit pair, although other start codes may be used.

Exemplary operations of formatting circuit 310 are described below with respect to various configuration modes common to the Virtex-II FPGA product family. For the exemplary operations described below, the TMS/TDI bit pairs that form the configuration data are stored in a byte-wide format in a first partition 320A of external storage device 320 such that each byte of configuration data contains four TMS/TDI bit pairs, and the TMS/TDI bit pairs that form the soft data are stored in a byte-wide format in a second partition 320B of external storage device 320 such that each byte of soft data contains four TMS/TDI bit pairs. However, it is to be understood that for other embodiments, the configuration data and the soft data may be stored in external storage device 320 in other formats.

Figure 5A:
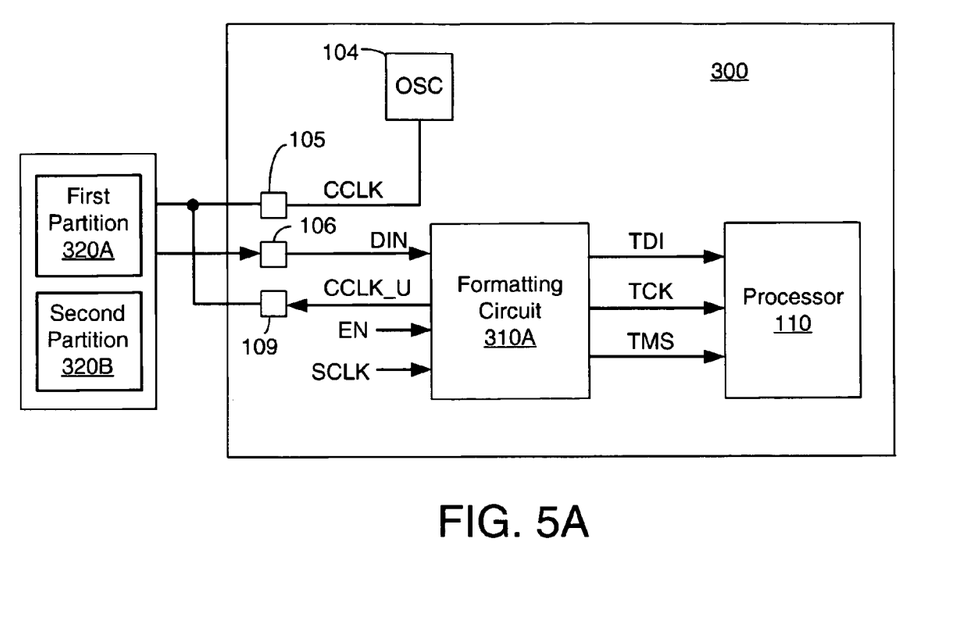
FIGS. 5A-5D are more detailed functional block diagrams of embodiments of FIG. 3 that utilize various configuration modes in accordance with the present invention.
Figure 6:
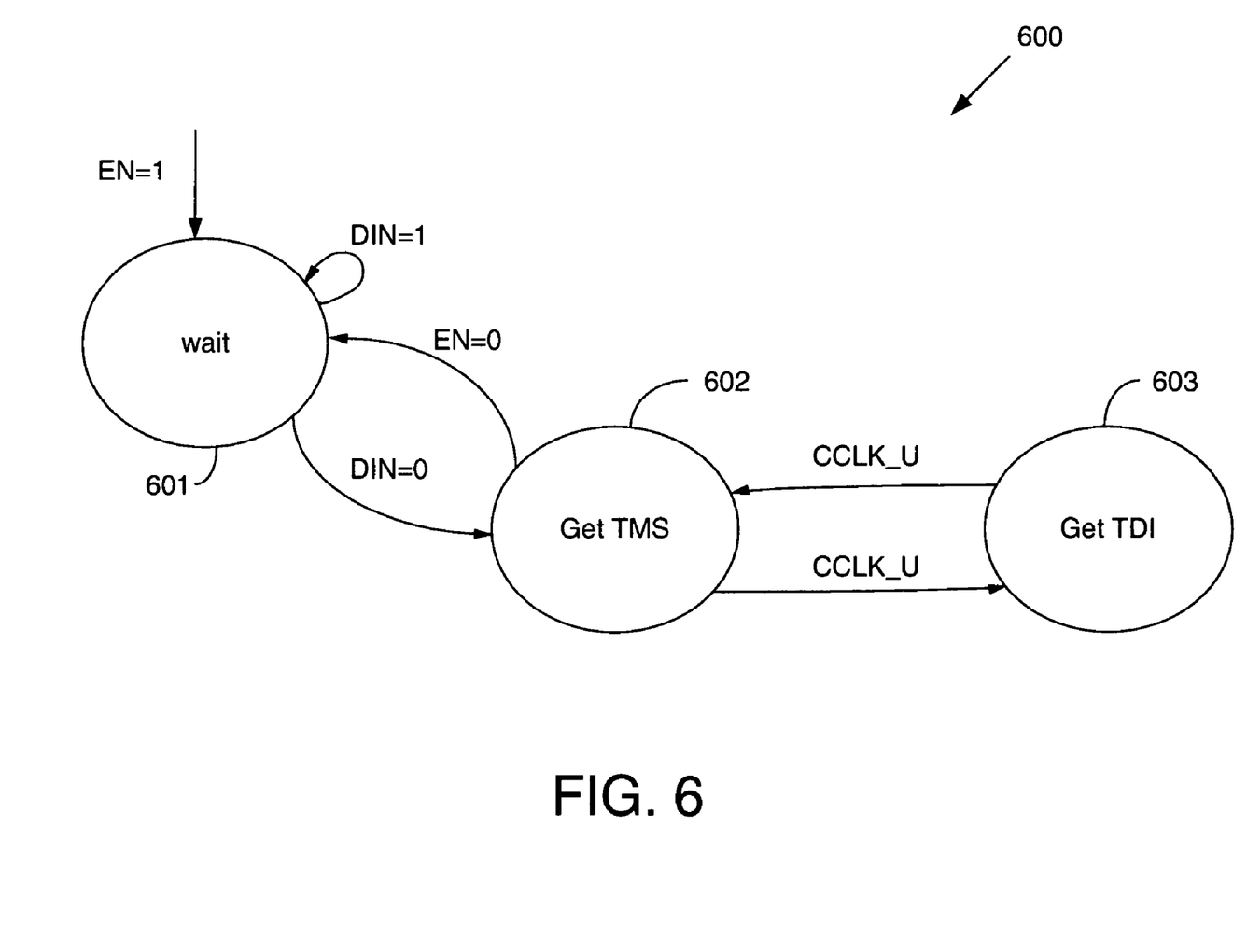
FIG. 6 is a state diagram for exemplary embodiments of the formatting circuits of FIGS. 5A and 5B.

FIG. 5A shows a portion of FPGA 300 having a formatting circuit 310A that is configured to operate in the master-serial configuration mode, and FIG. 6 shows a state diagram generally descriptive of the operation of formatting circuit 310A. Formatting circuit 310A includes a clock output to generate a user configuration clock signal CCLK_U that is used to clock a serial bitstream from external storage device 320 into FPGA 100 via its configuration input pin 106. CCLK_U is provided to an FPGA I/O pin 109, which in turn is coupled externally to the input clock pin of external storage device 320, as illustrated in FIG. 5A. Referring also to FIG. 3, during configuration of FPGA 300, configuration data is clocked from first storage partition 320A into the FPGA using CCLK and thereafter loaded into configuration memory 140 and/or block RAM 130 via configuration circuit 102 in a well-known manner. Then, oscillator 104 pulls clock pin 105 to a high impedance state to prevent external storage device 320 from outputting additional data to the FPGA.

Thereafter, EN is asserted (e.g., to logic high), which initializes formatting circuit 310A to a wait state 601. In response thereto, formatting circuit 310A generates CCLK_U, which is used to clock the soft data TMS/TDI bit pairs from second storage partition 320B into formatting circuit 310A via data pin 106. When formatting circuit 310A detects the first DIN=0 bit, which as described above is part of the start code [1,0], formatting circuit 310A transitions to state 602 and receives the next DIN bit as TMS. On the next transition of CCLK_U, formatting circuit 310A transitions to state 603 and receives the next DIN bit as TDI. The next transition of CCLK_U causes formatting circuit 310A to transition to state 602 and receive the next DIN bit as TMS, and so on, until the all the TMS and TDI bit pairs of the soft data received from second storage partition 320B are processed by formatting circuit 310A. Formatting circuit 310A uses the TMS bits and TCK to clock the TDI bits as a JTAG-compatible bitstream to processor 110. Then, EN is de-asserted (e.g., to logic low), which causes formatting circuit 310A to return to the wait state 601. Thereafter, debug unit 114 can access, control, and/or load data into the internal resources of processor 110 using the JTAG bitstream and associated control signals generated provided by formatting circuit 310A in a well-known manner.

Figure 5B:
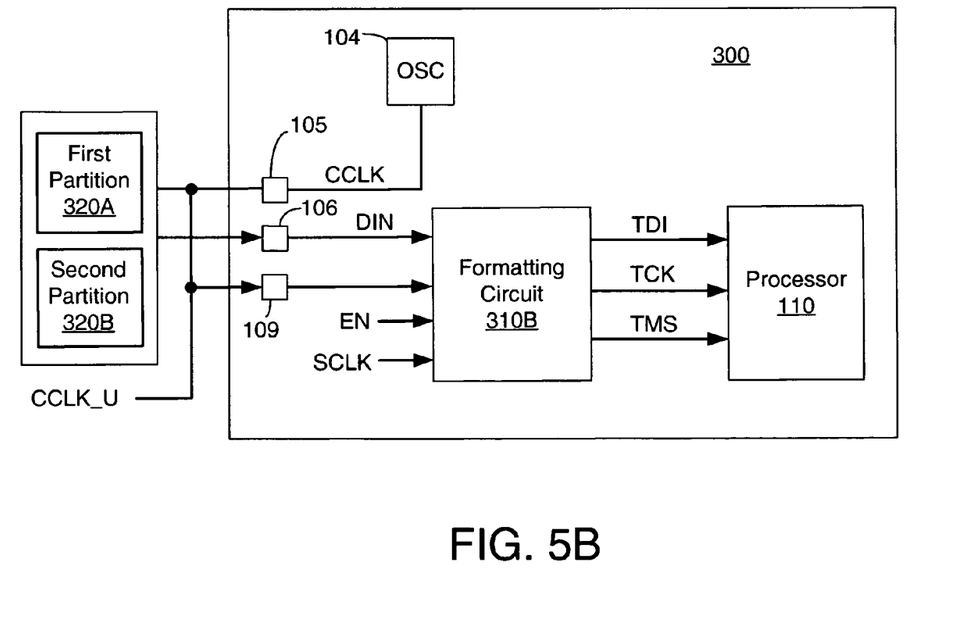

FIG. 5B shows a portion of FPGA 300 having a formatting circuit 310B that is configured to operate in the slave-serial configuration mode. Operation of formatting circuit 310B in the slave serial mode is identical to that of formatting circuit 310A, except that CCLK_U is generated externally and provided to formatting circuit 310 via pin 109.

Figure 5C:
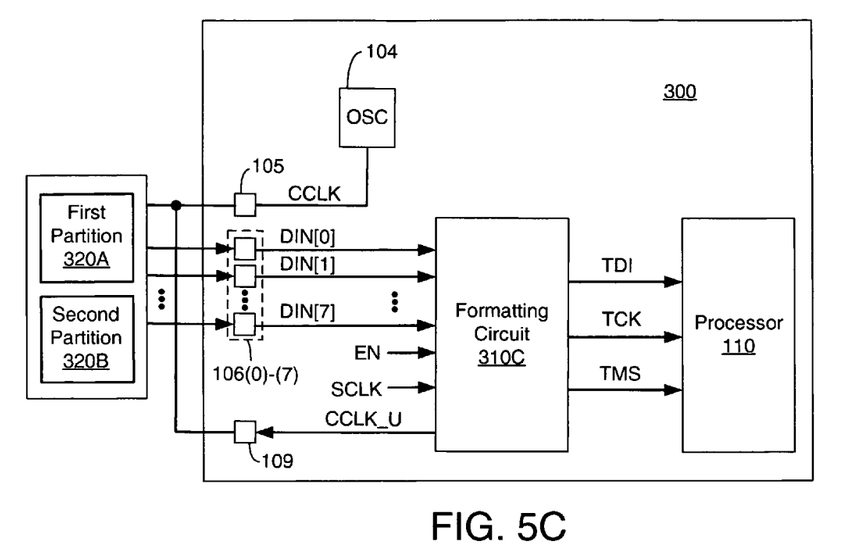
Figure 7:
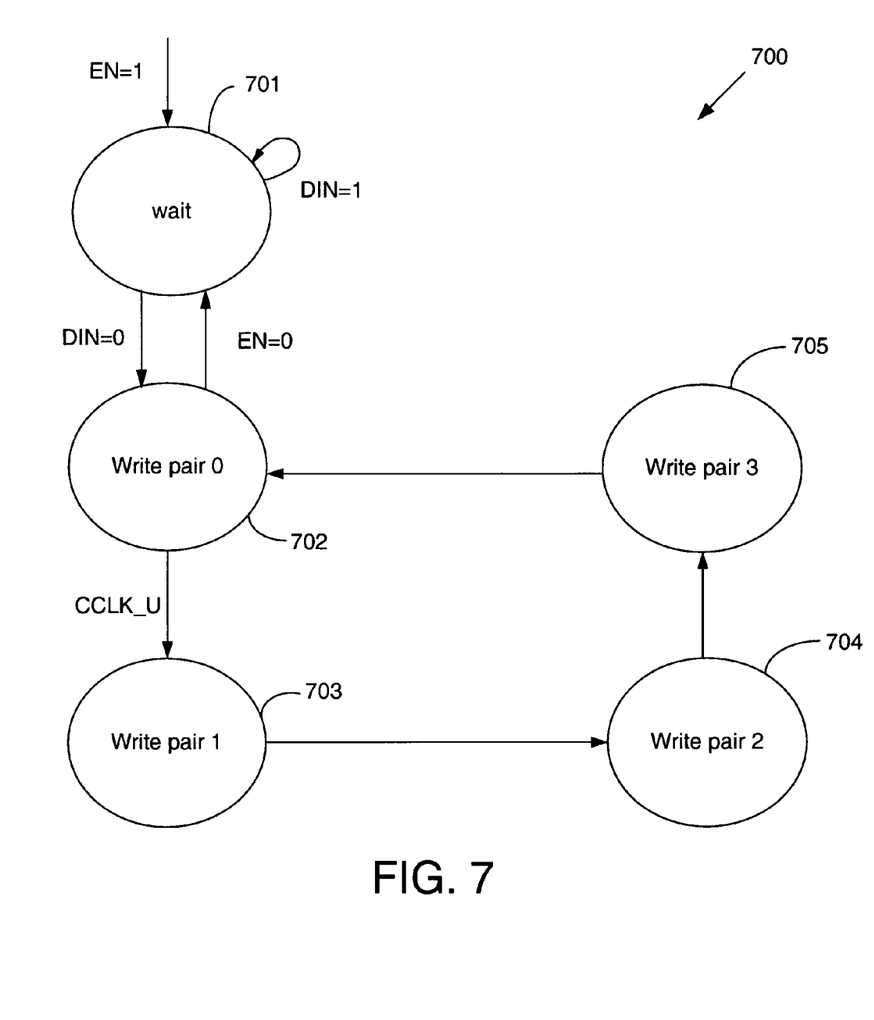
FIG. 7 is a state diagram for exemplary embodiments of the formatting circuits of FIGS. 5C and 5D.

FIG. 5C shows a portion of FPGA 300 having a formatting circuit 310C that is configured to operate in the master SelectMap configuration mode, and FIG. 7 shows a state diagram generally descriptive of the operation of formatting circuit 310C. Formatting circuit 310C includes 8 data inputs to receive soft data in a byte-wide format DIN[0:7] from second partition 320B of external storage device 320 via corresponding configuration data pins 106(0)-106(7). For other embodiments, formatting circuit 310C can include other numbers of data input pins to receive other numbers of bits in parallel from external storage device 320. During configuration of FPGA 300, oscillator 104 pulls clock pin 105 to a high impedance state after the configuration data is loaded from first partition 320A of external storage device 320 to configuration circuit 102, as described above with respect to FIG. 5A.

Thereafter, EN is asserted, which initializes formatting circuit 310C in a wait state 701. In response thereto, formatting circuit 310C generates CCLK_U, which is used to clock the soft data from second partition 320B in parallel format to formatting circuit 310C via configuration data pins 106. When formatting circuit 310C receives the start code, e.g., the first data byte that include a series of 1's followed by a 0, formatting circuit 310C transitions to state 702, and receives the first byte D[0:7] of the soft data. When CCLK_U transition states, formatting circuit 310C outputs D[0] as TDI and outputs D[1] as TMS, then transitions to state 703 and outputs D[2] as TDI and outputs D[3] as TMS, then transitions to state 704 and outputs D[4] as TDI and outputs D[5] as TMS, and then transitions to state 705 and outputs D[6] as TDI and outputs D[7] as TMS. Formatting circuit 310C then transitions back to state 702 and waits for the next logic transition of CCLK_U, after which formatting circuit 310C processes the next data byte received via pins 106(0)-106(7) into TDI and TMS signals as described above. This process continues until EN is de-asserted (e.g., to logic low), which causes formatting circuit 310C to return to the wait state 701. Thereafter, debug unit 114 can access, control, and/or load data into the internal resources of processor 110 using the JTAG signals generated by formatting circuit 310C in a well-known manner.

Figure 5D:
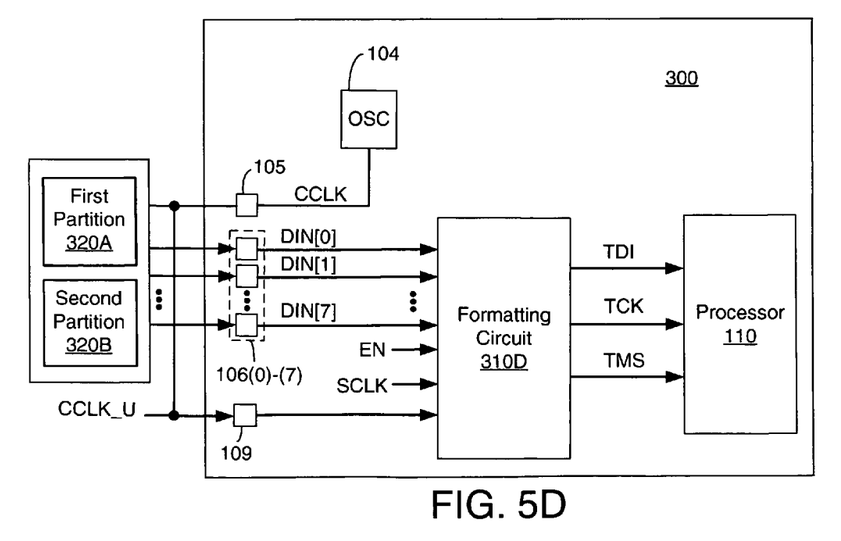

FIG. 5D shows a portion of FPGA 300 having a formatting circuit 310D that is configured to operate in the slave SelectMap configuration mode. Operation of formatting circuit 310D in the slave SelectMap mode is identical to that of formatting circuit 310C, except that CCLK_U is generated externally.

The above described embodiments show CCLK_U being externally coupled to the FPGA configuration clock pin 105 via pin 109, which is consistent with current Virtex-II Pro architectures. However, for other embodiments, CCLK_U can be internally coupled to the FPGA clock pin 105.

As described above, formatting circuits 310A-310D transition states in response to logic transitions of CCLK_U. For some embodiments, formatting circuits 310A-310D transition states in response to rising edges of CCLK_U. For other embodiments, formatting circuits 310A-310D transition states in response to falling edges of CCLK_U. For still other embodiments, formatting circuits 310A-310D can transition states in response to both rising and falling edges of CCLK_U.

For some embodiments, FPGA 300 may include more than one of formatting circuits 310A-310D to allow itself to be configured using various configuration modes described above. For other embodiments, formatting circuit 310 may be programmable to selectively implement any one of the various configuration modes describe above.

Figure 8:
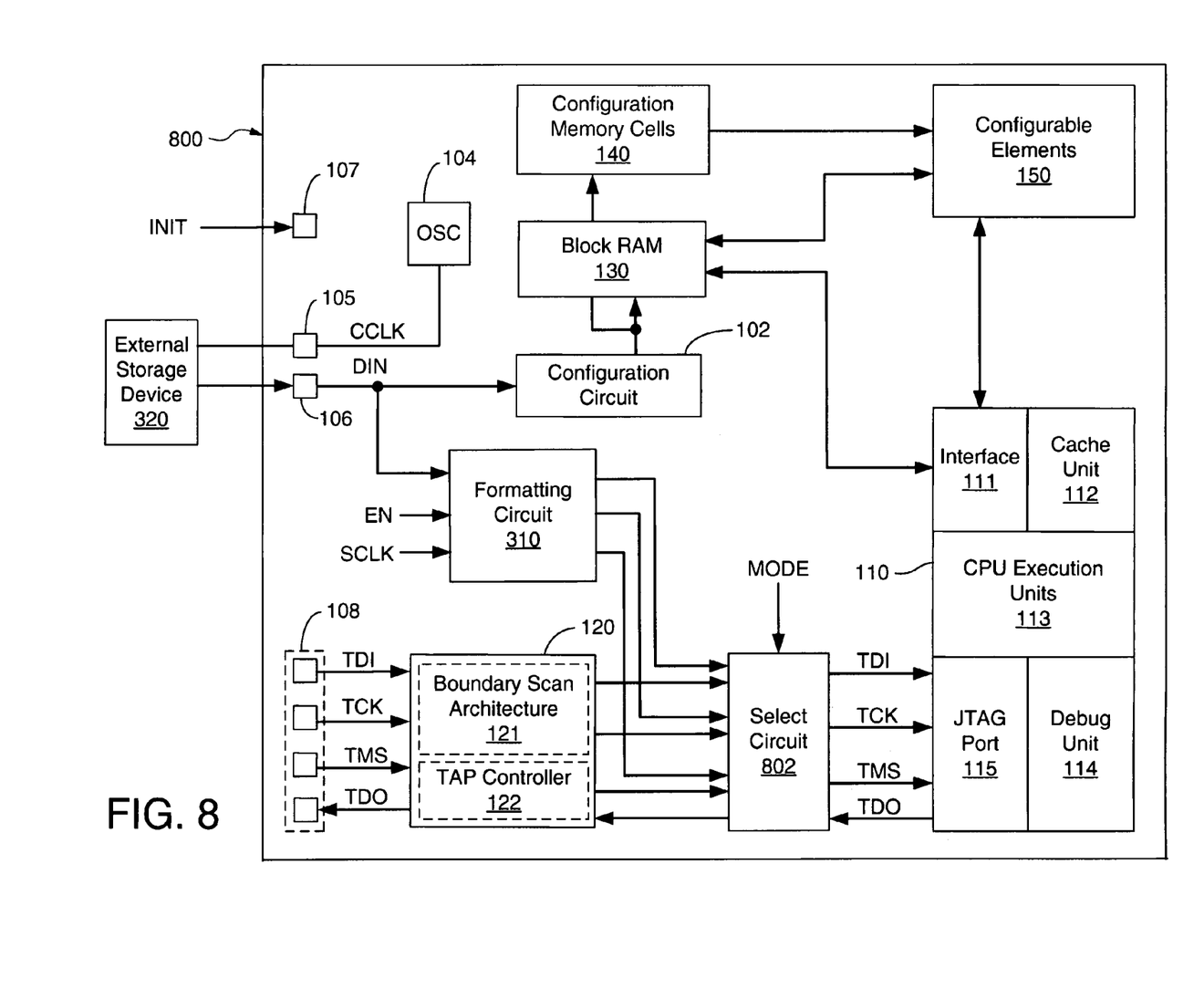
FIG. 8 is a functional block diagram of another embodiment of the FPGA of FIG. 3.

For other embodiments, the outputs of JTAG test circuitry 120 and formatting circuit 310 can be selectively connected to the embedded processor's JTAG port 115 so that an external controller (e.g., configuration tool 170 of FIG. 1) connected to JTAG pins 108 can utilize the FPGA's JTAG test circuitry 120 to access, control, and/or load data into the processor's internal resources. FIG. 8 shows an FPGA 800 that is another embodiment of FPGA 300 of FIG. 3. FPGA 800, which includes all the elements of FPGA 300, also includes a select circuit 802 having first inputs to receive the TDI, TCK, and TMS signals from JTAG test circuit 120, second inputs to receive the TDI, TCK, and TMS signals from formatting circuit 310, outputs to provide TDI, TCK, and TMS signals to corresponding inputs of processor 110's JTAG port 115, and a control terminal to receive a mode select signal MODE. When MODE is in a first state, select circuit 802 forwards the JTAG signals from formatting circuit 310 to processor 110. When MODE is in a second state, select circuit 802 forwards the JTAG signals from JTAG test circuitry 120 to processor 110. MODE can be generated in any suitable manner. For some embodiments, MODE can be generated by internal FPGA components. For other embodiments, MODE can be generated externally (e.g., by a user), and provided to FPGA 800 via FPGA I/O pin (not shown for simplicity).

Figure 9:
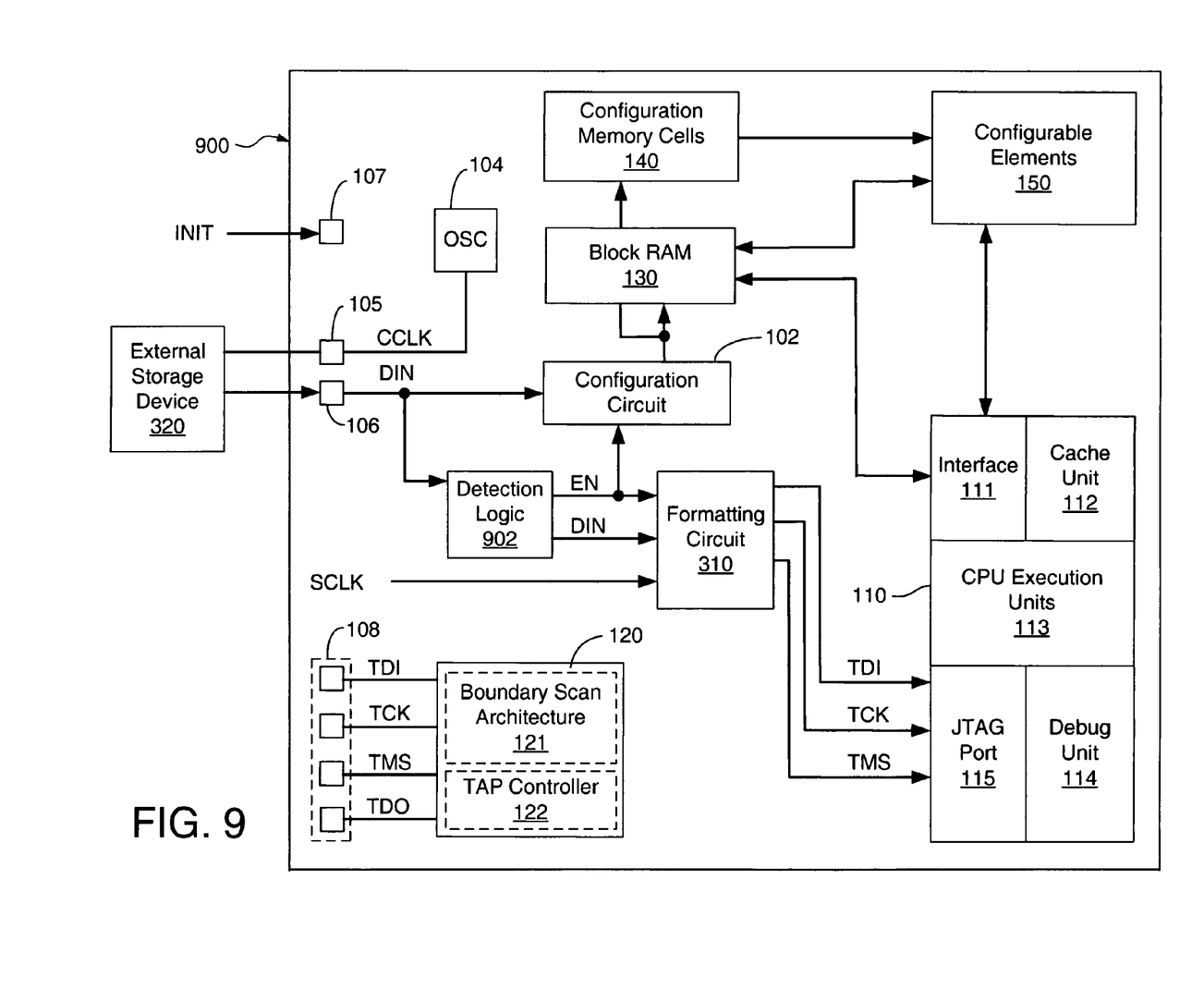
FIG. 9 is a functional block diagram of an FPGA in accordance with another embodiment of the present invention.

For the embodiments described above, the configuration data is stored in a first partition of external storage device 320, and the soft data is stored in a second partition of external storage device 320. For other embodiments, the configuration data and the soft data may be stored in the same partition of external storage device 320. For such embodiments, a trigger signal may be inserted between the configuration data and the soft data to indicate a boundary between the configuration data and the soft data. For example, FIG. 9 shows an FPGA 900 that is a modified embodiment of FPGA 300 of FIG. 3. In addition to all the elements of FPGA 300 described above, FPGA 900 includes detection logic 902 having an input to receive DIN, a first output to selectively provide DIN to formatting circuit 310, and a second output to generate EN. Detection logic 902 monitors DIN for the trigger signal that indicates the boundary between the configuration data and the soft data contained in DIN. While configuration data contained in DIN is provided to configuration circuit 102, detection logic 902 maintains EN in a de-asserted (e.g., logic low) state that enables configuration circuit 102 and disables formatting circuit 310. When the trigger signal is detected, thereby indicating that subsequent portions of DIN are soft data to be loaded into processor 110, detection logic 902 asserts EN (e.g., to logic high), which in turn disables configuration circuit 102 and enables formatting circuit 310. Once enabled, formatting circuit 310 receives the soft data contained in DIN and formats it into a JTAG-compatible bitstream that can be loaded into processor 110 to access, control, and/or load data into its internal resources in the manner described above. For other embodiments of FIG. 9, EN may be provided to oscillator 104 to cause oscillator 104 to drive configuration clock pin 105 to a high impedance state when all of the configuration data stored in external storage device 320 has been loaded into FPGA 900.

While particular embodiments of the present invention have been shown and described, it will be obvious to those skilled in the art that changes and modifications may be made without departing from this invention in its broader aspects, and therefore, the appended claims are to encompass within their scope all such changes and modifications as fall within the true spirit and scope of this invention. For example, although described above as controlling resources internal to processor 110, for other embodiments, embodiments of the present invention may be used to access, control, and/or load data into external resources available to processor 110 (e.g., external cache, register files, or other memory). In addition, although present embodiments are described above in the context of JTAG-compliant test circuitry, embodiments of the present invention can be used with other suitable test architectures and standards.

What is claimed is:

1. An integrated circuit (IC), comprising:
   one or more configurable elements;
   one or more configuration memory cells to store configuration data for the configurable elements;
   an embedded processor having one or more resources, a test port to receive a test bitstream, and a debug unit capable of accessing the one or more resources in response to the test bitstream;
   wherein the test port comprises a JTAG port, and the test bitstream comprises a JTAG-compatible bitstream;
   a configuration circuit having an input to receive the configuration data from an external storage device, and having an output connected to the configuration memory cells;
   a formatting circuit having an input to receive soft data from the external storage device and having outputs connected to the processor's test port;
   a plurality of JTAG input/output (I/O) pins;
   a JTAG-compliant test circuit having a plurality of inputs coupled to corresponding JTAG I/O pins, and having a plurality of outputs; and
   a select circuit having first inputs coupled to corresponding outputs of the JTAG-compliant test circuit, second inputs coupled to corresponding outputs of the formatting circuit, outputs coupled to the processor's JTAG port, and a control terminal to receive a mode signal.

2. The IC of claim 1, wherein the formatting circuit formats the soft data into the test bitstream.

3. The IC of claim 1, further comprising:
   test circuitry having an input port coupled to one or more corresponding test pins of the IC and having an output port selectively coupled to the processor's test port.

4. The IC of claim 1, wherein the formatting circuit further comprises a control input to receive an enable signal for enabling the formatting circuit to process the soft data.

5. The IC of claim 4, wherein de-assertion of the enable signal prevents the formatting circuit from processing data received from the external storage device.

6. The IC of claim 1, wherein the soft data comprises information for controlling the one or more resources of the processor.

7. The IC of claim 6, wherein the test bitstream comprises bus commands for the processor.

8. The IC of claim 1, wherein the test bitstream comprises firmware code to be loaded into a cache memory of the processor.

9. The IC of claim 1, wherein the test bitstream comprises data to be loaded into an architectural register of the processor.

10. The IC of claim 1, wherein the soft data comprises firmware code.

11. The IC of claim 10, wherein the one or more resources comprises a cache memory.

12. The IC of claim 1, wherein the soft data is stored in the external storage device as a plurality of bit pairs, each bit pair comprising a JTAG-compatible test data input (TDI) bit and a JTAG-compatible test mode select (TMS) bit.

13. The IC of claim 12, wherein the soft data includes a start code that instructs the formatting circuit to format subsequent portions of the soft data into the JTAG-compatible bitstream.

14. The IC of claim 12, wherein the external storage device comprises:
 a first partition for storing the configuration data; and
 a second partition for storing the soft data.

15. The IC of claim 12, wherein the formatting circuit is configurable to receive the bit pairs from the external storage device either serially or in parallel.

16. The IC of claim 1, wherein the select circuit forwards the JTAG-compatible bitstream from the formatting circuit to the processor's JTAG port when the mode signal is in a first state, and connects the JTAG-compliant test circuit to the processor's JTAG port when the mode signal is in a second state.

17. The IC of claim 1, wherein the formatting circuit comprises:
 one or more first formatting circuits configured to receive the soft data serially from the external storage device; and
 one or more second formatting circuits configured to receive the soft data in parallel from the external storage device.

18. The IC of claim 1, wherein the formatting circuit is configurable to receive the soft data from the external storage device either serially or in parallel.

19. An integrated circuit (IC), comprising:
 a plurality of configurable elements;
 an embedded processor having one or more resources, a test port to receive a test bitstream, and means for accessing the one or more resources;
 wherein the test port comprises a JTAG port, and the test bitstream comprises a JTAG-compatible bitstream;
 one or more configuration pins to receive data from an external storage device during configuration of the IC, the data including configuration data for configuring the configurable elements and soft data for use by the processor;
 means for formatting the soft data received from the external storage device via the one or more configuration pins to generate the test bitstream;
 plurality of JTAG input/output (I/O) pins;
 a JTAG-compliant test circuit having a plurality of inputs coupled to corresponding JTAG I/O pins, and having a plurality of outputs; and
 a select circuit having first inputs coupled to corresponding outputs of the JTAG-compliant test circuit, second inputs coupled to corresponding outputs of the means for formatting, outputs coupled to the processor's JTAG port, and a control terminal to receive a mode signal.

20. The IC of claim 19, further comprising:
 test circuitry having an input port coupled to one or more corresponding test pins of the IC and having an output port selectively coupled to the processor's test port.

21. The IC of claim 19, wherein the one or more resources comprise a cache memory and the soft data comprises firmware code for the processor.

22. The IC of claim 19, wherein the one or more resources comprise a bus system and the soft data comprises a bus command.

23. The IC of claim 19, wherein the means for formatting is configurable to receive the soft data from the external storage device either serially or in parallel.

24. The IC of claim 19, wherein the soft data is stored in the external storage device as a plurality of bit pairs, each bit pair comprising a JTAG-compatible test data input (TDI) bit and a JTAG-compatible test mode select (TMS) bit.

25. The IC of claim 24, wherein the soft data includes a start code that instructs the means for formatting to format subsequent portions of the soft data into the JTAG-compatible bitstream.

26. The IC of claim 19, wherein the external storage device comprises:
 a first partition for storing the configuration data; and
 a second partition for storing the soft data.

27. The IC of claim 19, further comprising:
 means for configuring the configurable elements with the configuration data.

28. The IC of claim 19, wherein the select circuit forwards the JTAG-compatible bitstream from the formatting circuit to the processor's JTAG port when the mode signal is in a first state, and connects the JTAG-compliant test circuit to the processor's JTAG port when the mode signal is in a second state.

29. A method of controlling one or more resources of a processor embedded in an integrated circuit (IC), the processor including a test port and test circuitry, comprising:
 loading soft data from an external storage device into the IC via one or more configuration pins on the IC;
 formatting the soft data into a test bitstream and associated test control signals;
 forwarding the test bitstream and the associated test control signals to the processor via a select circuit coupled to receive the test bitstream and the associated test control signals as a first input and coupled to receive outputs of a JTAG-compliant test circuit as a second input;
 loading the test bitstream and the associated test control signals into the processor via the test port; and
 implementing one or more functions in the processor as specified by the test bitstream via the test circuitry.

30. The method of claim 29, wherein the test port comprises a JTAG port and the test bitstream comprises a JTAG-compliant bitstream.

31. The method of claim 29, wherein implementing one or more functions comprises loading firmware code stored in the external storage device into a cache memory within the processor.

32. The method of claim 29, wherein implementing one or more functions comprises updating data stored in a memory element within the processor with soft data retrieved from the external storage device.

33. The method of claim 29, wherein implementing one or more functions comprises providing instructions received from the external storage device to the processor to initialize one or more of the resources to a desired state.

34. The method of claim 30, further comprising:
storing the soft data in the external storage device as a plurality of JTAG test data input (TDI) and test mode select (TMS) bit pairs.

35. The method of claim 34, further comprising:
inserting a start code as an initial set of bit pairs of the soft data stored in the external storage device.

36. The method of claim 35, further comprising:
enabling the formatting in response to detection of the start code.

37. The method of claim 29, further comprising:
storing configuration data for one or more configurable elements of the IC in a first partition of the external storage device; and
storing the soft data in a second partition of the external storage device.

38. The method of claim 37, further comprising:
loading the configuration data into a configuration memory associated with one or more configurable elements of the IC.

39. A method of configuring an integrated circuit (IC) having an embedded processor that includes test circuitry, comprising:
storing configuration data capable of configuring one or more configurable elements of the IC in an external storage device;
storing soft data capable of accessing one or more resources of the embedded processor into the external storage device;
loading the configuration data from the external storage device into a configuration memory of the IC via one or more IC configuration pins;
loading the soft data from the external storage device into the IC via the one or more IC configuration pins;
formatting the soft data into a test bitstream and associated test control signals;
forwarding the test bitstream and the associated test control signals to the processor via a select circuit coupled to receive the test bitstream and the associated test control signals as a first input and coupled to receive outputs of a JTAG-compliant test circuit as a second input; and
loading the data embodied in the test bitstream into one or more resources selected by the processor's test circuitry in response to the associated test control signals.

40. The method of claim 39, wherein the soft data comprises firmware code for the processor and one of the resources comprises a cache memory of the processor.

41. The method of claim 39, wherein one of the resources comprises an architectural register of the processor.

42. The method of claim 39, wherein the test bitstream comprises a JTAG-compliant bitstream.

43. The method of claim 42, further comprising:
disabling a JTAG-compliant test architecture associated with the IC.

44. The method of claim 42, further comprising:
storing the soft data in the external storage device as a plurality of JTAG data and mode select bit pairs.

45. The method of claim 44, wherein the soft data further comprises a start code capable of enabling the formatting.

46. The method of claim 39, further comprising:
storing the configuration data in a first partition of the external storage device and storing the soft data in a second partition of the external storage device.

* * * * *